(12) United States Patent
Yang et al.

(10) Patent No.: US 10,972,878 B2
(45) Date of Patent: Apr. 6, 2021

(54) METHOD AND APPARATUS FOR PROVIDING UNICAST BASED MULTIMEDIA SERVICE

(71) Applicant: Samsung Electronics Co., Ltd., Suwon-si (KR)

(72) Inventors: Hyun-Koo Yang, Seoul (KR); Kyung-Mo Park, Seoul (KR); Jae-Hyeon Bae, Seoul (KR); Young-Wan So, Gunpo-si (KR); Byeong-Doo Choi, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 132 days.

(21) Appl. No.: 15/767,897

(22) PCT Filed: Oct. 13, 2016

(86) PCT No.: PCT/KR2016/011489
§ 371 (c)(1),
(2) Date: Apr. 12, 2018

(87) PCT Pub. No.: WO2017/065520
PCT Pub. Date: Apr. 20, 2017

(65) Prior Publication Data
US 2018/0310139 A1   Oct. 25, 2018

(30) Foreign Application Priority Data
Oct. 13, 2015 (KR) .......... 10-2015-0143104

(51) Int. Cl.
*G06F 15/16* (2006.01)
*H04W 4/08* (2009.01)
(Continued)

(52) U.S. Cl.
CPC .............. *H04W 4/08* (2013.01); *H04W 4/06* (2013.01); *H04W 28/10* (2013.01); *H04W 56/004* (2013.01); *H04W 56/0015* (2013.01)

(58) Field of Classification Search
CPC ......... H04W 28/10; H04W 4/08; H04W 4/06; H04W 56/0015; H04W 56/004; H04W 56/001
(Continued)

(56) References Cited

U.S. PATENT DOCUMENTS 9,088,630 B2    7/2015 Gupta et al.
2005/0058089 A1*  3/2005 Vijayan .................... H04B 7/12
                                                       370/312
(Continued)

FOREIGN PATENT DOCUMENTS

CN    101076989 A    11/2007
CN    101884217 A    11/2010
(Continued)

OTHER PUBLICATIONS

Chinese Office Action dated Aug. 5, 2020, issued in Chinese Patent Application No. 201680060042.1.
(Continued)

*Primary Examiner* — Karen C Tang
(74) *Attorney, Agent, or Firm* — Jefferson IP Law, LLP

(57) ABSTRACT

A method for providing a multimedia service based on unicast, according to the present invention, comprises the steps of: packetizing multimedia data; when a terminal accesses the multimedia service, determining a mode for transmitting the multimedia data to the terminal; generating a signaling message including information on the determined mode, and transmitting the signaling message to the
(Continued)

terminal; and transmitting first data among the packetized multimedia data to the terminal on the basis of the determined mode.

10 Claims, 7 Drawing Sheets

(51) Int. Cl.
*H04W 4/06* (2009.01)
*H04W 56/00* (2009.01)
*H04W 28/10* (2009.01)
*G06F 15/173* (2006.01)

(58) Field of Classification Search
USPC .......................................................... 709/231
See application file for complete search history.

(56) References Cited

U.S. PATENT DOCUMENTS

| | | |
|---|---|---|
| 2006/0077994 A1 | 4/2006 | Spindola et al. |
| 2006/0126667 A1* | 6/2006 | Smith ................ H04N 7/17318 370/486 |
| 2009/0013356 A1* | 1/2009 | Doerr .................... H03M 13/29 725/62 |
| 2009/0063681 A1* | 3/2009 | Ramakrishnan ... H04N 7/17318 709/225 |
| 2009/0083811 A1 | 3/2009 | Dolce et al. |
| 2009/0094639 A1* | 4/2009 | Haberman ......... G06Q 30/0251 725/34 |
| 2009/0279701 A1* | 11/2009 | Moisand ............... H04L 12/185 380/270 |
| 2010/0246591 A1* | 9/2010 | Gobriel .................. H04L 12/12 370/412 |
| 2011/0010585 A1* | 1/2011 | Bugenhagen ....... H04L 41/5022 714/32 |
| 2012/0182896 A1 | 7/2012 | Jang et al. |
| 2012/0185783 A1* | 7/2012 | Avellan ................ H04N 21/222 715/760 |
| 2013/0250844 A1 | 9/2013 | Lee et al. |
| 2013/0272251 A1* | 10/2013 | Schmidt ................ H04W 72/12 370/329 |
| 2013/0322511 A1* | 12/2013 | Varma ................ H04L 27/0014 375/230 |
| 2014/0022975 A1 | 1/2014 | Chen et al. |
| 2014/0105132 A1* | 4/2014 | Park ........................ H04L 47/54 370/329 |
| 2014/0317664 A1 | 10/2014 | Park et al. |
| 2015/0195588 A1 | 7/2015 | Park et al. |
| 2015/0350099 A1 | 12/2015 | Sun et al. |
| 2016/0295254 A1* | 10/2016 | Chen ................ H04N 21/23406 |
| 2019/0349617 A1* | 11/2019 | White ................ H04N 21/2368 |

FOREIGN PATENT DOCUMENTS

| | | |
|---|---|---|
| CN | 103888381 A | 6/2014 |
| KR | 10-2013-0143126 A | 12/2013 |
| KR | 10-2014-0125690 A | 10/2014 |
| KR | 10-2015-0083407 A | 7/2015 |
| WO | 2012/081882 A2 | 6/2012 |
| WO | 2012/150831 A2 | 11/2012 |

OTHER PUBLICATIONS

Examination report dated Jan. 12, 2021, issued in Indian Application No. 201817017475.

* cited by examiner

METHOD AND APPARATUS FOR PROVIDING UNICAST BASED MULTIMEDIA SERVICE

CROSS-REFERENCE TO RELATED APPLICATIONS

This application is a U.S. National Stage application under 35 U.S.C. § 371 of an International application filed on Oct. 13, 2016 and assigned application number PCT/KR2016/011489, which claimed the benefit of a Korean patent application filed on Oct. 13, 2015 in the Korean Intellectual Property Office and assigned Serial number 10-2015-0143104, the entire disclosure of which is hereby incorporated by reference.

TECHNICAL FIELD

The present disclosure relates to a multimedia service method and apparatus for supporting synchronization between devices in a system that provides a multimedia service to multiple users using a unicast-based transmission scheme.

BACKGROUND ART

In the 21st century information society, multimedia services have encountered their seasons of high qualities and personalization. Especially with the recent commercialization of communication systems capable of transmitting high-quality multimedia data to personal devices at high speeds, such as 4th-Generation (4G) Long Term Evolution (LTE), and so forth, multimedia data of the same quality as existing broadcasting may be transmitted in real time using a unicast-based multimedia transmission system. Thus, a need exists for a method for supporting synchronized reproduction or presentation between devices to provide the same user experience as in a real-time broadcasting system by using the unicast-based multimedia transmission system.

The above information is presented as background information only to assist with an understanding of the present disclosure. No determination has been made, and no assertion is made, as to whether any of the above might be applicable as prior art with regard to the present disclosure.

DETAILED DESCRIPTION OF THE INVENTION

Technical Problem

An embodiment of the present disclosure provides a unicast-based multimedia service method and apparatus for supporting synchronization between devices.

An embodiment of the present disclosure also provides a transmission mode switch method and apparatus for minimizing a service connection time in a unicast-based multimedia service supporting synchronization between devices.

Moreover, an embodiment of the present disclosure provides a receiver buffer management method and apparatus for minimizing a service connection time in a unicast-based multimedia service supporting synchronization between devices.

Technical Solution

A method for providing a multimedia service based on unicast according to an embodiment of the present disclosure includes determining a mode for transmitting the multimedia data to a user equipment (UE) if the UE accesses the multimedia service and generating a signaling message including information about the determined mode, transmitting the signaling message to the UE, and transmitting first data of the packetized multimedia data to the UE based on the determined mode.

An apparatus for providing a multimedia service based on unicast according to an embodiment of the present disclosure includes a controller configured to determine a mode for transmitting the multimedia data to a UE if the UE accesses the multimedia service, a packet generator configured to packetize multimedia data and to generate a signaling message including information about the determined mode, under control of the controller, and a packet transmitter configured to transmit the signaling message to the UE and to transmit first data of the packetized multimedia data to the UE based on the determined mode, under control of the controller.

Other aspects, advantages, and key features of the present disclosure will be processed together with the attached drawings, and will be apparent to those of ordinary skill in the art from the following detailed description disclosing various embodiments of the present disclosure.

Before undertaking the DETAILED DESCRIPTION OF THE INVENTION below, it may be advantageous to set forth definitions of certain words and phrases used throughout this patent document: The terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like, and the term "controller" means any device, system or part thereof that controls at least one operation, and such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

Advantageous Effects

An embodiment of the present disclosure supports synchronization between devices in a system that provides a unicast-based multimedia service.

An embodiment of the present disclosure also reduces a service connection time of a device using a unicast-based multimedia service.

In addition, an embodiment of the present disclosure reduces a buffer size of a device using a unicast-based multimedia service.

BRIEF DESCRIPTION OF DRAWINGS

The above and other aspects, features and advantages of certain exemplary embodiments of the present disclosure will be more apparent from the following description taken in conjunction with the accompanying drawings, in which.

Throughout the drawings, similar reference numerals will be understood to refer to identical or similar elements, features, and structures.

MODE FOR CARRYING OUT THE INVENTION

Figure 1:
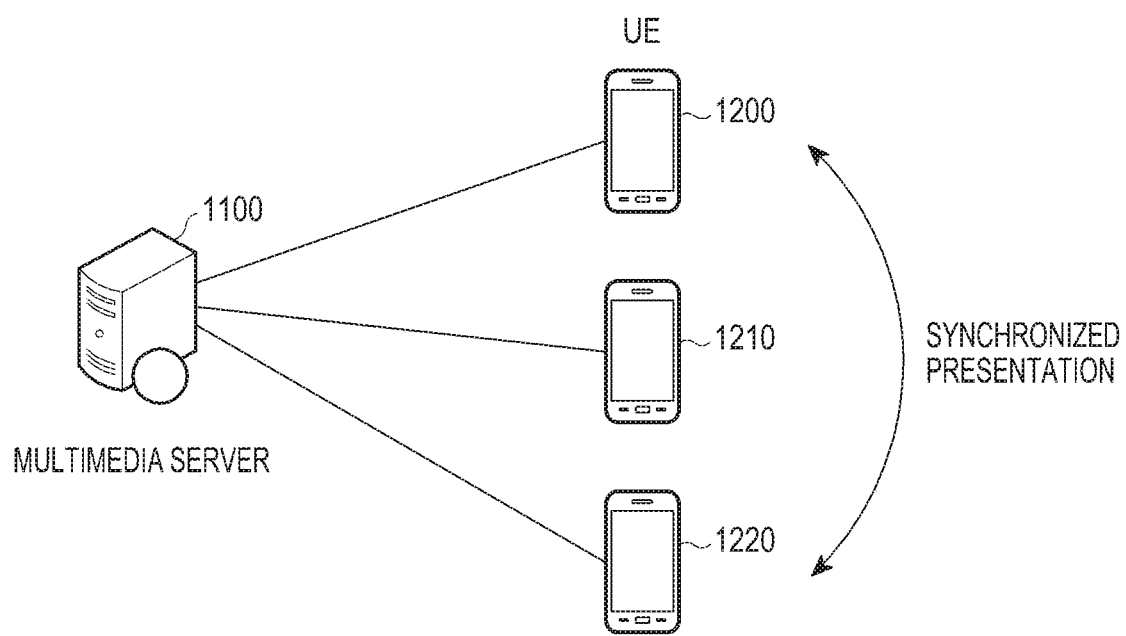
FIG. 1 illustrates a multimedia service supporting synchronization between devices according to an embodiment of the present disclosure.

The following detailed description made referring to the accompanying drawings may help the comprehensive understanding of various embodiments of the present disclosure defined by claims and equivalents thereof. The following detailed description includes various specific details for understanding thereof, but these details will be regarded simply as examples. Therefore, those of ordinary skill in the art may recognize that various changes and modifications of various embodiments described herein may be made without departing from the scope and spirit of the present disclosure. In addition, a description of well-known functions and structures may be omitted for clarity and brevity.

Terms and words used in the following detailed description and claims are not limited to bibliographic meaning, but merely used by the inventor to enable a clear and consistent understanding of the present disclosure. Thus, it should be apparent to those of ordinary skill in the art that the following description of various embodiments of the present disclosure is provided merely for illustrative purposes, and not for purposes of limiting the present disclosure defined by the claims and their equivalents.

It is to be understood that the singular forms include plural referents unless the context clearly dictates otherwise. Thus, for example, reference to "a component surface" includes reference to one or more of such surfaces.

Although the terms such as "first" and "second" used in the various exemplary embodiments of the present disclosure may modify various elements of the various exemplary embodiments, these terms do not limit the corresponding elements. These terms may be used for the purpose of distinguishing one element from another element. For example, a first element may be named as a second element without departing from the right scope of the various exemplary embodiments of the present disclosure, and similarly, a second element may be named as a first element. The term "and/or" includes a combination of a plurality of related provided items or any one of the plurality of related provided items.

The terms used in the various exemplary embodiments of the present disclosure are for the purpose of describing particular exemplary embodiments only and are not intended to be limiting. The singular forms are intended to include the plural forms as well, unless the context clearly indicates otherwise. The term "include" or "has" used in the exemplary embodiments of the present disclosure is to indicate the presence of features, numbers, steps, operations, elements, parts, or a combination thereof described in the specifications, and does not preclude the presence or addition of one or more other features, numbers, steps, operations, elements, parts, or a combination thereof.

All of the terms used herein including technical or scientific terms have the same meanings as those generally understood by an ordinary skilled person in the related art unless they are defined other. The terms defined in a generally used dictionary should be interpreted as having meanings that are the same as or similar with the contextual meanings of the relevant technology.

An electronic device according to various embodiments of the present disclosure may be a device including a communication function. For example, an electronic device may include a smartphone, a tablet personal computer (PC), a mobile phone, a video phone, an electronic-book (e-book) reader, a desktop PC, a laptop PC, a netbook computer, a workstation, a server, a personal digital assistant (PDA), a portable multimedia player (PMP), an MP3 player, a mobile medical equipment, a camera, and a wearable device (e.g., a head-mounted device (HMD), electronic clothing, an electronic bracelet, an electronic necklace, an electronic appcessory, an electronic tattoo, or a smart watch.

According to various embodiments of the present disclosure, the electronic device may be a smart home appliance having a communication function. For example, the smart home appliance may include a TV, a digital video disk (DVD) player, audio equipment, a refrigerator, an air conditioner, a vacuum cleaner, an oven, a microwave oven, a washer, a drier, an air cleaner, a set-top box, a TV box (e.g., HomeSync™ of Samsung, TV™ of Apple, or TV™ of Google), a game console, an electronic dictionary, a camcorder, and an electronic frame.

According to various embodiments of the present disclosure, the electronic device may include medical equipment (e.g., a magnetic resonance angiography (MRA) device, a magnetic resonance imaging (MRI) device, a computed tomography (CT) device, an imaging device, or an ultrasonic device), a navigation system, a global positioning system (GPS) receiver, an event data recorder (EDR), a flight data recorder (FDR), a vehicle infotainment device, electronic equipment for ships (e.g., a navigation system, gyroscope, and gyro compass for ships), avionics, a security device, an industrial or home robot, and so forth.

According to some embodiments, the electronic device may include a part of a furniture or building/structure having a communication function, an electronic board, an electronic signature receiving device, a projector, and various measuring instruments (for example, a water, electricity, gas, or electric wave measuring device).

The electronic device according to various embodiments of the present disclosure may be one of the above-listed devices or a combination thereof. It will be obvious to those of ordinary skill in the art that the electronic device according to various embodiments of the present disclosure is not limited to the above-listed devices.

An apparatus and method proposed in an embodiment of the present disclosure are applicable to various communication systems such as a mobile broadcasting service such as a digital multimedia broadcasting (DMB) service, a digital video broadcasting-handheld (DVP-H) service, an Advanced Television Systems Committee-mobile/handheld (ATSC-M/H) service, etc., a digital video broadcasting system such as an Internet protocol television (IPTV) service, an Moving Picture Experts Group (MPEG) media transport (MMT) system, an evolved packet system (EPS), a Long-Term Evolution (LTE) mobile communication system, an LTE-Advanced (LTE-A) mobile communication system, a high speed downlink packet access (HSDPA) mobile communication system, a high speed uplink packet access (HSUPA) mobile communication system, a high rate packet data (HRPD) mobile communication system of the 3GPP2, a wideband code division multiple access (WCDMA) mobile communication system of the 3GPP2, a code division multiple access (CDMA) mobile communication system of the 3GPP2, the Institute of Electrical and Electronics Engineers (IEEE) 802.16m communication system, an evolved packet system (EPS), a mobile Internet Protocol (IP) system, and so forth.

FIG. 1 illustrates a system for a multimedia service supporting synchronization between devices according to an embodiment of the present disclosure.

Referring to FIG. 1, a multimedia server 1100 is a transmitter that provides a multimedia service to three user equipments (UEs) 1200, 1210, and 1220 that are receivers. Hereinbelow, a multimedia server and a transmitter are used interchangeably, and a receiver and a UE are used interchangeably. While three UEs are illustrated in FIG. 1 as an example, the present disclosure is not limited to this example, and the multimedia server 1100 may provide a multimedia service to two or more UEs. A multimedia service supporting synchronization between devices means that even when different UEs connect to the multimedia service at different times, all UEs accessing the multimedia service reproduce or present the same point in time of the multimedia service at the same absolute time. In this case, the multimedia server 1100 delivers multimedia data to each UE by using a unicast-based transmission protocol, and each UE independently accesses the multimedia server 1100 at a different time. The unicast-based transmission protocol may be, for example, an MMT protocol (MMTP) defined in the International Organization for Standardization/International Electrotechnical Commission (ISO/IEC) 230008-1 MMT standards, and the multimedia data may be encapsulated and delivered according to a media processing unit (MPU) format defined in the ISO/IEC 230008-1 MMT standards.

Figure 2:
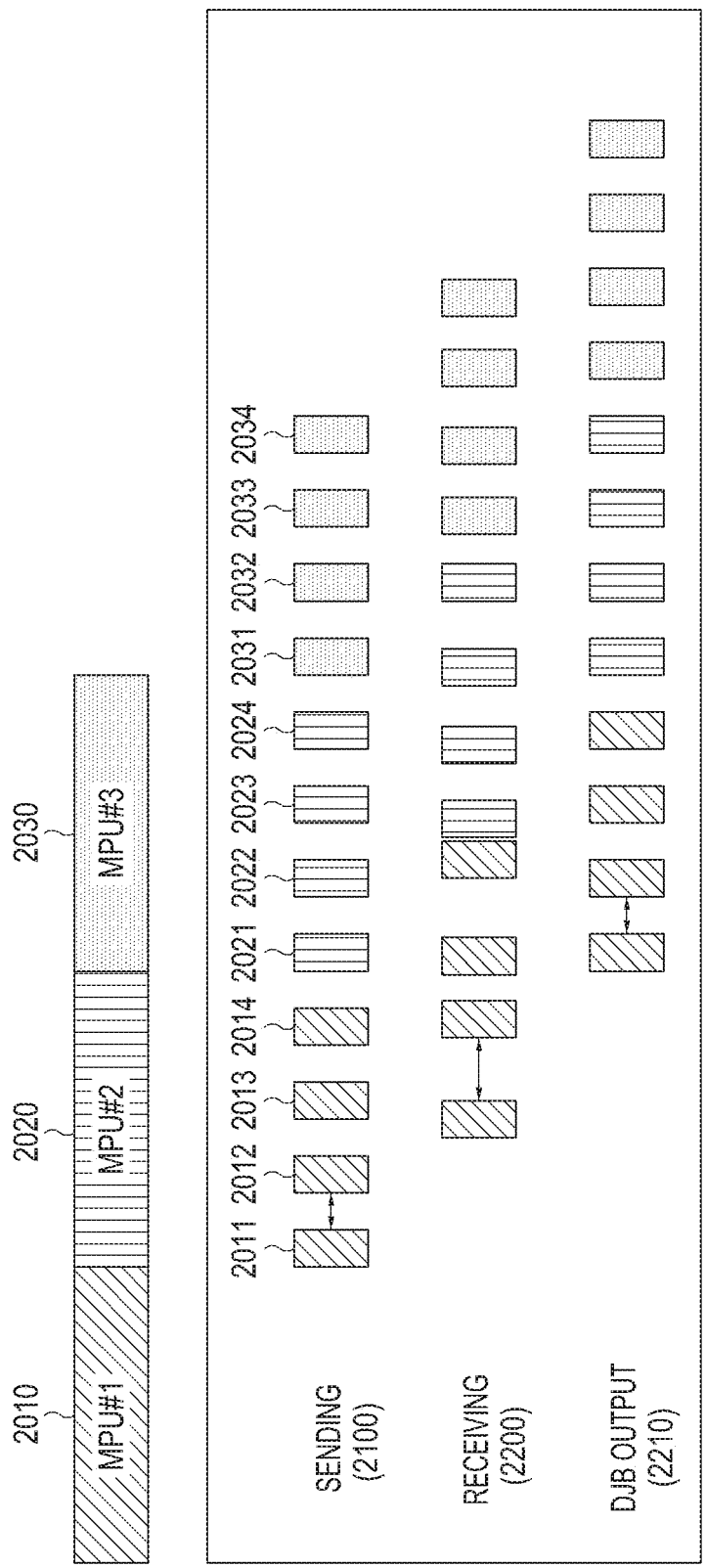
FIG. 2 illustrates a transmission/reception timing of a packet according to an embodiment of the present disclosure.

FIG. 2 illustrates a transmission/reception timing of an MMTP packet according to an embodiment of the present disclosure. In FIG. 2, it is assumed that a multimedia server encapsulates multimedia data into an MPU and transmits the MPU to a UE by using the MMT protocol, and the UE receives the multimedia data by using the MMT protocol.

Referring to FIG. 2, the multimedia server divides the multimedia data into a plurality of independent pieces and encapsulates the pieces into MPUs 2010, 2020, and 2030, respectively. Thereafter, the MPUs each are packetized into one or more MMTP packets 2011-2014, 2021-2024, and 2031-2034 according to the MMTP, which are then transmitted with the same time interval as indicated by 2100. However, even if the multimedia server transmits the MMTP packets with the same time interval, a reception interval of the MMTP packets by a receiver (a UE) may be changed without being maintained as the same time interval due to fixed characteristics and variable characteristics of an intermediate network positioned between the multimedia server and the receiver (the UE), as indicated by 2200. Such a change in the reception interval is referred to as a network jitter, and if the jitter exists, a problem such as buffer overflow or underflow may occur. Thus, the MMT protocol absorbs the jitter at a transmission protocol level by using a de-jittering buffer (DJB) to render the transmission network into a network having a logically fixed delay time, as indicated by 2210. That is, the MMT server may perform packet scheduling on the assumption that the MMT server is connected with an MMT client by a network having a fixed delay. A parameter for managing the DJB is transmitted through a MMTP packet that is separate from an MMTP packet that is formatted using MMT signaling to transmit media data, as will be later described in detail. While it is assumed in the foregoing embodiment that the multimedia server transmits the MMTP packet with the same time interval for convenience, the transmission time interval of the MMTP may vary with a configuration and an implementation method of the multimedia service, which is not related to the subject matter of the present disclosure and thus will not be described in detail herein.

Although FIG. 2 shows only a process of packetizing and transmitting multimedia data, a process of exchanging control information for service connection and presentation as well as the multimedia data may also be required, In addition, it is illustrated in FIG. 2 that the multimedia server transmits the MMTP packet with the same time interval for convenience, but it would be obvious to those of ordinary skill in the art that in real implementation, the multimedia server may also be transmitted with different time intervals.

Moreover, in the embodiment illustrated in FIG. 2, transmission/reception timings after generation of an MPU are shown assuming that a session between the multimedia server and the UE has already been connected, but it would be obvious to those of ordinary skill in the art that in real implementation, since the UE accesses the multimedia server at an arbitrary time, the multimedia server may have to adjust a transmission timing based on a connection time of each UE and an MPU generation time.

In the following embodiment of the present disclosure, a detailed description will be made of transmission timing adjustment by the multimedia server. To this end, parameters will be defined first as below.

MPU[i]: an $i^{th}$ MPU of a multimedia service.
MG[i]: a time at which the $i^{th}$ MPU is ready for transmission.
MS[i]: a time at which transmission of the $i^{th}$ MPU starts in the multimedia server.
ME[i]: a time at which transmission of the $i^{th}$ MPU ends in the multimedia server.
MP[i]: a presentation time of the $i^{th}$ MPU.
TJ[j]: a time at which a $j^{th}$ UE accesses the server.
TR[j]: a time at which multimedia data (MPU) may be transmitted to the $j^{th}$ UE.

In the embodiment of the present disclosure described below, the parameter MG[i] will be regarded as a time at which generation of the $i^{th}$ MPU is completed. Depending on implementation, for a live multimedia service, a part of an MPU that is ready may be transmitted before completion of generation of the MPU to reduce a delay time, and when recorded/edited multimedia content is provided, a previously generated and stored MPU may be used. Even for the live multimedia service, to secure stability of the server, an MPU is generated and may be transmitted after being stored in a buffer for a predetermined time.

Figure 3:
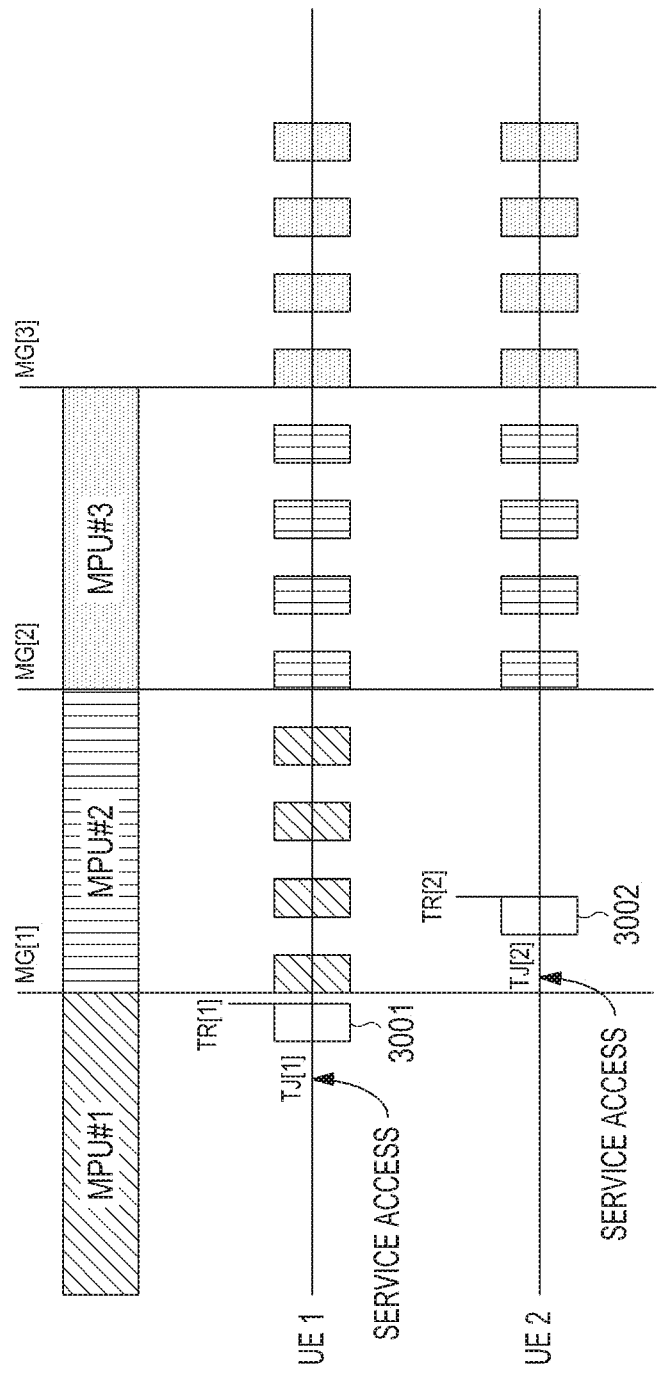
FIG. 3 illustrates a timing to transmit a packet to a plurality of user equipments (UEs) according to a first embodiment of the present disclosure.

FIG. 3 illustrates a timing for a multimedia server to transmit a packet to a plurality of UEs according to a second embodiment of the present disclosure.

Referring to FIG. 3, once a UE1 accesses a multimedia service at TJ[1], the multimedia server transmits a signaling message 3001 to the UE1 for session configuration and service acquisition and presentation. The multimedia server packetizes and transmits real multimedia data (MPU) from TR[1] after transmission of the signaling message 3001. In FIG. 3, MG[1] at which generation of an MPU #1 is completed follows TR[1], and thus the multimedia server packetizes the MPU #1 and transmits the same to the UE1.

Once a UE2 accesses the multimedia service at TJ[2], the multimedia server transmits a signaling message 3002 to the UE2 for session configuration and service acquisition and presentation. However, since TR[2] follows MG[1] and precedes MG[2] at which generation of the MPU #2 is completed, the multimedia server transmits the MPU #2 to the UE2 after MG[2] without transmitting the MPU #1 to the UE2.

As shown in FIG. 3, the UE2 needs a longer time until receiving and presenting actual multimedia data after the initial service connection (TJ[2]) than the UE1. In an embodiment of the present disclosure, the multimedia server transmits multimedia data through independent unicast sessions for the UE1 and the UE2, but a transmission interval of an MMTP packet may vary with management of a decoding buffer and a rendering buffer of a receiver, such that it is desirable to use the same scheduling for the UE1 and the UE2.

Figure 4:
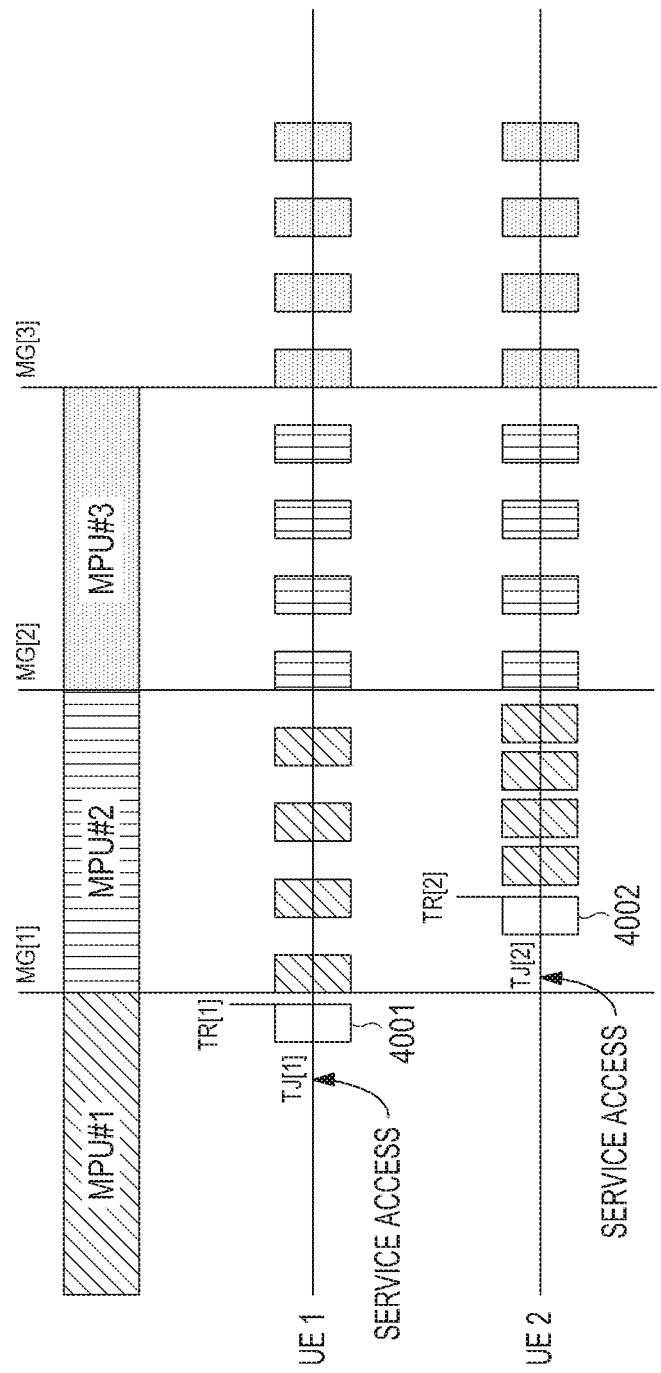
FIG. 4 illustrates a timing to transmit a packet to a plurality of UEs according to a second embodiment of the present disclosure.

FIG. 4 illustrates a timing to transmit a packet to a plurality of UEs according to a second embodiment of the present disclosure.

Referring to FIG. 4, once a UE1 connects a multimedia service at TJ[1], the multimedia server transmits a signaling message 4001 to the UE1 for session configuration and service acquisition and presentation. The multimedia server packetizes and transmits real multimedia data (MPU) from TR[1] after transmission of the signaling message 4001. In FIG. 4, MG[1] at which generation of an MPU #1 is completed follows TR[1], and thus the multimedia server packetizes the MPU #1 and transmits the same to the UE1.

Once a UE2 accesses the multimedia service at TJ[2], the multimedia server transmits a signaling message 4002 to the UE2 for session configuration and service acquisition and presentation. The multimedia server transmits the MPU #1 to the UE2 between TR[2] at which transmission of the signaling message 4002 is completed and MG[2] at which generation of the MPU #2 is completed, and after MG[2], the multimedia server transmits the MPU #2 to the UE2. The multimedia server transmits a signaling message (not shown) indicating switch of a transmission mode to the UE2 before MS[2] at which transmission of the MPU #2 starts.

That is, the multimedia server transmits the MPU #1 to the UE2 by using scheduling that is different from that of the UE1 before MG[2], and uses the same scheduling for the UE1 and the UE2 after MG[2].

As such, after MG[i], for UEs capable of transmitting multimedia data, a mode in which the multimedia server transmits an MPU #i to all of the UEs by using the same scheduling is referred to as a normal mode (NM) and a mode in which the multimedia server transmits the MPU #i to the respective UEs fast by using different scheduling is referred to as a burst mode (BM).

An embodiment of the present disclosure includes determining, by the multimedia server, whether to use the burst mode for a new UE when the UE newly accesses a multimedia service, and applying the burst mode or the normal mode to the newly connecting UE based on a determination result.

Figure 5:
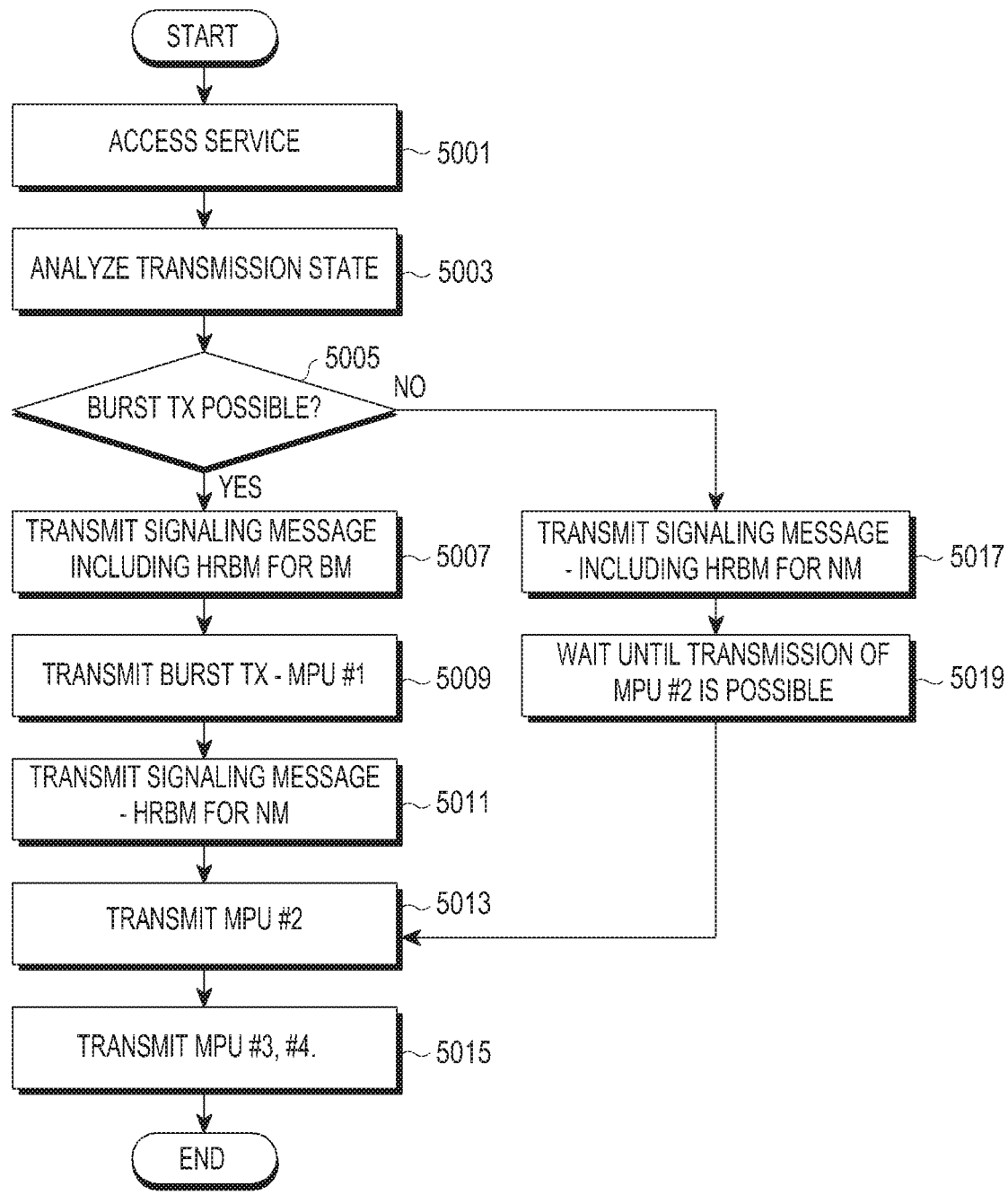
FIG. 5 is a flowchart illustrating operations of a multimedia server according to an embodiment of the present disclosure.

FIG. 5 is a flowchart illustrating operations of a multimedia server according to an embodiment of the present disclosure.

Referring to FIG. 5, once the UE accesses a multimedia service in operation 5001, the multimedia server analyzes a transmission state such as information about the multimedia service, information about a network to which the UE connects, a connection time of the UE to the multimedia service, a buffer model of a receiver, a bandwidth needed for burst mode transmission, a currently available bandwidth, a time at which transmission of the multimedia data to the UE is possible, and so forth in operation 5003 and determines whether to apply the burst mode to the UE in operation 5005. For example, the multimedia server may determine that the burst mode is applicable if the currently available bandwidth is greater than the bandwidth needed for bust mode transmission and the bandwidth needed for burst mode transmission may accept a maximum data rate of an MMTP packet for a burst mode operation. If determining that the burst mode is applicable, the multimedia server transmits a signaling message to be applied to the burst mode in operation 5007 and transmits the first MPU (MPU #1) to the burst mode in operation 5009. Thereafter, the multimedia server transmits the signaling message to be applied to the normal mode in operation 5011 and performs normal-mode transmission from the second MPU (MPU #2) in operations 5013 and 5015. That is, if determining that the burst mode is applicable, the multimedia server may follow a timing of transmission to the UE2 shown in FIG. 4.

If determining that the burst mode is not applicable, the multimedia server transmits the signaling message to be applied to the normal mode in operation 5017, waits until transmission of the second MPU (MPU #2) is possible, without transmitting the first MPU (MPU #1), and then performs normal-mode transmission from the second MPU (MPU #2). That is, if determining that the burst mode is not applicable, the multimedia server may follow a timing of transmission to the UE2 shown in FIG. 3.

The signaling messages to be applied to the burst mode and the normal mode may include a hypothetical receiver buffer model (HRBM) message of the MMT standards. The HRBM message may be updated by switch of a transmission mode.

Determination of whether the burst mode is applicable according to an embodiment of the present disclosure may be made based on the following parameters:

A bandwidth needed for burst mode transmission;
Available bandwidth;
A time when transmission of multimedia data to a UE is possible; and
A buffer model of a receiver.

A time when transmission of multimedia data to the UE is possible means a time when a signaling message may be transmitted to another UE and transmission of the $i^{th}$ MPU may start if the other UE newly accesses the multimedia service after transmission of the $i^{th}$ MPU to one UE starts. The buffer model of the receiver means a maximum size of the DJB buffer, the delay time, and the size of the decoder buffer of the receiver.

Table 1 shows an HRBM message defined in the MMT standards.

TABLE 1

| Syntax | No. of bits |
|---|---|
| HRBM( ) { | |
| message_id | 16 |
| version | 8 |

TABLE 1-continued

| Syntax | No. of bits |
|---|---|
| length | 16 |
| max_buffer_size | 32 |
| fixed_end_to_end_delay | 32 |
| max_transmission_delay | 32 |
| } | |

Each element has the following means:
message_id: an identifier for identifying an HRBM message.
version: a version of the HRBM message.
length: a length of the HRBM message in a byte unit (a length from the next byte if the length field to the last byte of the HRBM message).
max_buffer_size: a maximum size of a de jitter buffer (DJB) in a byte unit.
fixed_end_to_end_delay: a fixed delay value between a transmitter (a multimedia server) and a receiver (a UE), which is a result of adding an additional buffer time for an ALFEC if the ALFEC is applied.
max transmission delay: a predicted and allowable maximum transmission delay value between a transmitter (a multimedia server) and a receiver (a UE).
max_buffer_size is calculated as below.

max_buffer_size=(maximum delay−minimum delay)*maximum bit rate

In the above equation, a maximum delay indicates a maximum delay between a transmitter and a receiver, a minimum delay indicates a minimum relay between the transmitter and the receiver, and a maximum bit rate indicates a maximum data rate of an MMTP packet, and among these values, the maximum delay and the maximum bit rate are transmitted from the transmitter to the receiver through a signaling message, and the minimum delay is a value that is previously known to the transmitter through a process such as service setup, etc.

In an embodiment of the present disclosure, the HRBM message may be updated in an MPU unit. The updated HRBM message may be transmitted to the receiver by the multimedia server before transmission of the next MPU starts after transmission of one MPU ends. If receiving the updated HRBM message from the multimedia server, the receiver compares a transmission time of an MMTP packet header including the HRBM message with a transmission time of an MMTP packet header including each MPU and determines a time to apply the updated HRBM message.

In another embodiment of the present disclosure, the HRBM message of Table 1 may further include a field indicating a sequence number of an MPU to which the updated HRBM message is to be applied. In the following embodiment, HRBM parameters mean max_buffer_size and fixed_end_to_end_delay.

The HRBM operates in the unit of an asset indicating a media component. If the receiver receives the MMTP packet, the MMTP packet is first stored in the DJB, and the MMTP packet stored in the DJB is output and processed at a time after fixed_end_to_end_delay from a transmission time of the MMTP packet. For example, suppose that three MMTP packets are transmitted at 1:00:00, 1:00:10, and 1:00:20, respectively, from the multimedia server and are received at 1:00:03, 1:00:11, and 1:00:22, respectively by the receiver. In this case, if fixed_end_to_end_delay of the HRBM message is set to 5 seconds, the DJB of the receiver stores the received three MMTP packets and outputs them at 1:00:05, 1:00:15, and 1:00:25, respectively. Once the HRBM message is updated, the receiver logically defines a new DJB complying with HRBM parameter values included in the updated HRBM message, and the MMTP packet transmitted after update of the HRBM message is processed according to the new DJB defined by the updated HRBM message.

Hereinbelow, several values for setting the HRBM parameters according to an embodiment of the present disclosure will be defined. The following values have been calculated assuming transmission in the normal mode.
Time unit length of an MPU: D seconds
Maximum data rate of an MMTP packet: M bytes/s
A maximum data amount needed for transmission of one MPU: M*D bytes
fixed_end_to_end_delay: F seconds (minimum delay=d)
DJB buffer size: B=(F−d)*M bytes
Applicable time of a burst mode: J seconds (a difference between an MPU transmission preparation time and a time when transmission of multimedia data to a newly accessing UE is possible)

When the multimedia server operates in the burst mode, a maximum data rate M' of an MMTP packet increases as below.
M'=(M*D)/(D−J)

Thus, HRBM parameters for using the same HRBM message in both the burst mode and the normal mode without updating the HRBM message may be as follows:
max_buffer_size: (F−d)*M'=(F−d)*M*D/(D−J)
fixed_end_to_end_delay: F Since transmission is performed in the normal mode after the burst mode ends, the DJB added due to the burst mode may be a resource wasted without being used in the normal mode. In particular, if a jitter on a network is large or a data rate is high, a memory resource wasted without being used also increases. Thus, it is desirable to use different HRBM parameters in the burst mode and the normal mode in terms of resource efficiency.

When different HRBM parameters are used in the burst mode and the normal mode, the HRBM parameters may have the following values:
Burst Mode
max_buffer_size: (F−d)*M'=(F−d)*M*D/(D−J)
fixed_end_to_end_delay: F
Normal Mode
max_buffer_size: (F−d)*M
fixed_end_to_end_delay: F In another embodiment of the present disclosure, for F−d>=D, that is, if a jitter (F−d) of a transmission network is greater than or equal to an MPU transmission interval D, switch to the normal mode is performed before the DJB applying the HRBM parameter of the burst mode in the receiver outputs the MMTP packet. Thus, the receiver does not need to the DJB of the burst mode in the memory, and has no problem in its operation as long as securing a size equaling to the maximum data amount of the MMTP packet actually transmitted in the burst mode, (D−J)*M'=(D−J)*M*D/(D−J)=M*D byte.

Figure 6:
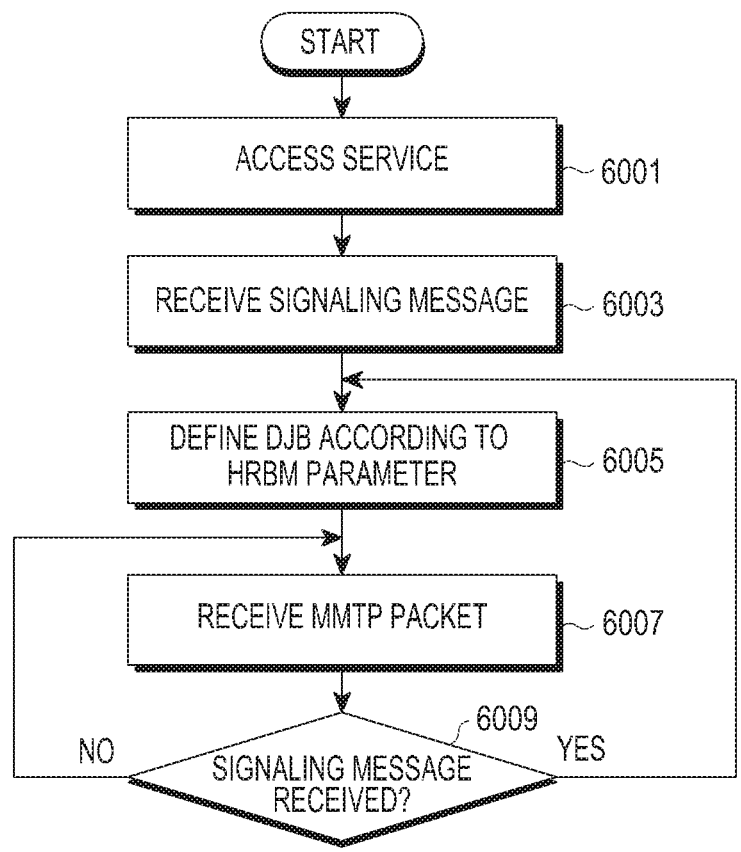
FIG. 6 is a flowchart illustrating operations of a UE according to an embodiment of the present disclosure.

FIG. 6 is a flowchart illustrating operations of a UE according to an embodiment of the present disclosure.

Referring to FIG. 6, once the UE accesses a multimedia service in operation 6001, the multimedia server analyzes a transmission state such as information about the multimedia service, information about a network to which the UE connects, a connection time of the UE to the multimedia service, a buffer model of a receiver, a bandwidth needed for burst mode transmission, a currently available bandwidth, a time at which transmission of the multimedia data to the UE is possible, and so forth, determines whether to apply the burst mode to the UE, and transmits a signaling message, and the UE receives the signaling message in operation 6003. The UE having received the signaling message defines a DJB based on an HRBM parameter included in the signaling message in operation 6005, and receives and processes an MMTP packet by using the defined DJB in operation 6007. Thereafter, the UE determines whether a new signaling message is received in operation 6009, goes back to operation 6005 to newly define the DJB based on an HRBM parameter included in a newly received signaling message if receiving the new signaling message, and receives and processes the MMTP packet by using the defined DJB in operation 6007. If the new signaling message is not received, the UE continues receiving the MMTP packet and processes the MMTP packet by using the previously defined JB in operation 6007.

When defining the DJB in the burst mode in operation 6005, the UE does not need to secure the DJB of the burst mode in the memory as described above if the jitter (F−d) of the transmission network is greater than or equal to the MPU transmission interval (D), and may secure only a size equaling to the maximum data amount of the MMTP packet actually transmitted in the burst mode, $(D-J)*M'=(D-J)*M*D/(D-J)=M*D$ byte.

Figure 7:
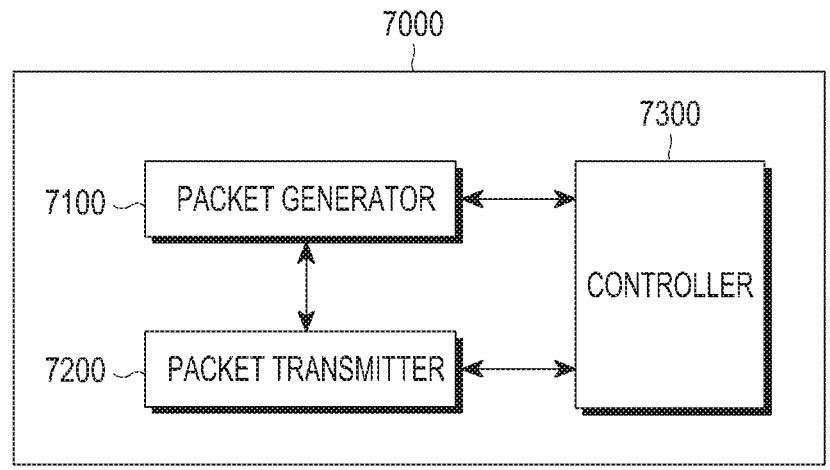
FIG. 7 is a block diagram of a multimedia server according to an embodiment of the present disclosure.

FIG. 7 is a block diagram of a multimedia server according to an embodiment of the present disclosure.

Referring to FIG. 7, a multimedia server 7000 may include a packet generator 7100, a packet transmitter 7200, and a controller 7300. The packet generator 7100 packetizes multimedia data into an MMTP packet under control of the controller 7300, and the packet transmitter 7200 transmits the MMTP packet under control of the controller 7300. According to an embodiment of the present disclosure described with reference to FIG. 5, the controller 7300 checks a transmission state to determine whether to apply the burst mode to a currently accessing UE, and if determining to apply the burst mode, controls the packet generator 7100 and the packet transmitter 7200 to generate and transmit a corresponding signaling message. If determining whether to change the burst mode to the normal mode and changing to the normal mode, the controller 7300 controls the packet generator 7100 and the packet transmitter 7200 to generate and transmit a corresponding signaling message.

Figure 8:
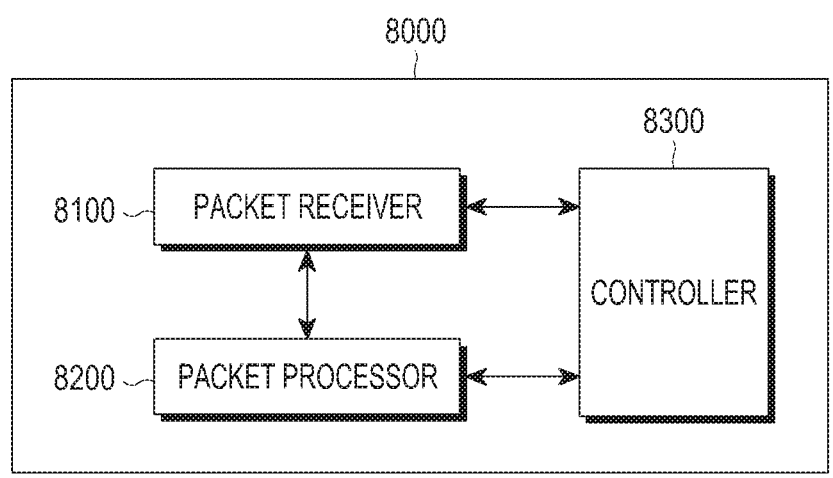
FIG. 8 is a block diagram of a UE according to an embodiment of the present disclosure.

FIG. 8 is a block diagram of a UE according to an embodiment of the present disclosure.

Referring to FIG. 8, a UE 8000 may include a packet receiver 8100, a packet processor 8200, and a controller 8300. The packet receiver 8100 receives an MMTP packet (including a signaling message) under control of the controller 8300, and the packet processor 8200 processes the received MMTP packet (including a signaling message) under control of the controller 8300. The controller 8300 defines a DJB based on an HRBM parameter included in a signaling message and controls an operation of the packet receiver 8100 based on the defined DJB, according to an embodiment of the present disclosure described in the description of FIG. 6.

While it is described in the above embodiment that only the first MPU is transmitted in a burst mode, the present disclosure is also applicable to a case where n MPUs are transmitted in the burst mode after connection of a new UE to a multimedia service and then transmission is performed in a normal mode from an $(n+1)^{th}$ MPU. The above-described detailed parameter values may change without spoiling the subject matter of the present disclosure.

Particular aspects of the present disclosure may be implemented with a computer-readable code on a computer-readable recording medium. The computer readable recording medium may be any type of data storage device that may store data readable by a computer system. Examples of record-mediums readable by the computer may include a read-only memory (ROM), a random-access memory (RAM), compact disk ROM (CD-ROM), magnetic tapes, floppy disks, optical data storage devices, carrier waves (such as data transmission through the Internet). The computer readable recording medium may be distributed through computer systems connected over a network, and thus the computer readable code is stored and executed in a decentralized manner. Further, functional programs, codes and code segments for achieving the present disclosure may be easily interpreted by programmers skilled in the art which the present disclosure pertains to.

The apparatus and method according to an embodiment of the present disclosure may be implemented by hardware, software, or a combination of hardware and software. Such arbitrary software may be stored, for example, in a volatile or non-volatile storage device (e.g., a read only memory (ROM), etc.), a memory (e.g., a random access memory (RAM), a memory chip, a memory device, or a memory integrated circuit (IC)), or a machine (e.g., computer) recordable optical or magnetic storage medium (e.g., a compact disk (CD), a digital versatile disk (DVD), a magnetic disc, a magnetic tape, etc.) regardless of its ability to erase or rewrite. It can be seen that the method according to the present disclosure may be implemented by a computer or a portable terminal which includes a controller and a memory, and the memory is an example of a machine-readable storage medium which is suitable for storing a program or programs including instructions for implementing the embodiment of the present disclosure.

Accordingly, the present invention includes a program that includes a code for implementing the apparatus and method set forth in the appended claims of the specification and a machine (computer, etc.) readable storage medium for storing the program. The program may be electronically transferred through an arbitrary medium such as a communication signal delivered through a wired or wireless connection, and the present disclosure properly includes equivalents thereof.

The apparatus according to an embodiment of the present disclosure may receive and store the program from a program providing device connected in a wired or wireless manner. The program providing device may include a memory for storing a program including instructions for instructing the apparatus to execute a preset method, information necessary for the method, a communication unit for performing wired or wireless communication with the apparatus, and a controller for transmitting a corresponding program to the apparatus at the request of the apparatus or automatically.

While embodiments of the present disclosure have been described, various changes may be made without departing the scope of the present disclosure. Therefore, the scope of the present disclosure should be defined by the appended claims and equivalents thereof, rather than by the described embodiments.

The invention claimed is:

1. A method for providing a multimedia service based on a unicast transmission scheme, the method comprising:
packetizing multimedia data and transmitting first data of the packetized multimedia data to a plurality of user equipments (UEs);
in response to a UE accessing the multimedia service during transmitting the first data of the packetized multimedia data, determining whether a first mode for transmitting the first data of the packetized multimedia data to the UE is available;
in response to the first mode being available, generating a first signaling message comprising information about the first mode, transmitting the first signaling message to the UE, and transmitting the first data of the packetized multimedia data to the UE, using the unicast transmission scheme, based on the first mode; and
after transmitting the first data based on the first mode, generating a second signaling message comprising information about a second mode, and transmitting the second signaling message to the UE and second data of the packetized multimedia data to the UE and the plurality of the UEs based on the second mode,
wherein the multimedia service provides synchronization between the plurality of UEs.

2. The method of claim 1, wherein the first mode is a burst mode for using different scheduling for a different UE and the second mode is a normal mode for using a same scheduling for all UEs.

3. The method of claim 1, further comprising:
in response to the first mode not being available:
generating the second signaling message and transmitting the second signaling message to the UE; and
transmitting the second data of the packetized multimedia data to the UE based on the second mode.

4. The method of claim 1, wherein the determining whether the first mode is available comprises determining that the first mode is available based on an available bandwidth and a required buffer size for the first mode.

5. The method of claim 1,
wherein each of the first signaling message and the second signaling message comprises information about a required buffer size for the first mode or the second mode, and information about a delay time between a server and the UE for the first mode or the second mode, and
wherein, when the first mode is available, the required buffer size is determined based on a time unit length of the multimedia data and a time needed for transmitting the multimedia data in the second mode.

6. An apparatus for providing a multimedia service based on a unicast transmission scheme, the apparatus comprising:
a transmitter; and
at least one processor configured to:
packetize multimedia data and control the transmitter to transmit first data of the packetized multimedia data to a plurality of user equipments (UEs),
in response to a UE accessing the multimedia service during transmitting the first data of the packetized multimedia data, determine whether a first mode for transmitting the first data of the packetized multimedia data to the UE is available,
in response to the first mode being available, generate a first signaling message comprising information about the first mode, control the transmitter to transmit the first signaling message to the UE, and transmit the first data of the packetized multimedia data to the UE, using the unicast transmission scheme, based on the first mode; and
after transmitting the first data based on the first mode, generate a second signaling message comprising information about a second mode, and control the transmitter to transmit the second signaling message to the UE and second data of the packetized multimedia data to the UE and the plurality of the UEs based on the second mode,
wherein the multimedia service provides synchronization between the plurality of UEs.

7. The apparatus of claim 6, wherein the first mode is a burst mode for using different scheduling for a different UE and the second mode is a normal mode for using a same scheduling for all UEs.

8. The apparatus of claim 6, wherein, in response to the first mode not being available, the at least one processor is further configured to generate the second signaling message and to control the transmitter to transmit the second signaling message and the second data of the packetized multimedia data to the UE based on the second mode.

9. The apparatus of claim 6, wherein the at least one processor is further configured to determine whether the first mode is available based on an available bandwidth and a required buffer size for the first mode.

10. The apparatus of claim 6,
wherein each of the first signaling message and the second signaling message comprises information about a required buffer size for the first mode or the second mode, and information about a delay time between a server and the UE for the first mode or the second mode, and
wherein, when the first mode is available, the required buffer size is determined based on a time unit length of the multimedia data and a time needed for transmitting the multimedia data in the first mode.

* * * * *